United States Patent [19]

Sullivan

[11] Patent Number: 5,238,669
[45] Date of Patent: Aug. 24, 1993

[54] PRODUCTION OF ULTRASTRUCTURAL CERAMICS BY SUPERCRITICAL PROCESSING OF THE CERAMIC PRECURSOR

[76] Inventor: Thomas M. Sullivan, P.O. Box 4615, San Diego, Calif. 92104

[21] Appl. No.: 890,379

[22] Filed: May 26, 1992

Related U.S. Application Data

[63] Continuation of Ser. No. 551,300, Jul. 11, 1990, abandoned, which is a continuation of Ser. No. 238,735, Aug. 31, 1988, Pat. No. 4,961,913.

[51] Int. Cl.$^5$ .............................................. C04B 35/01
[52] U.S. Cl. .................................. 423/344; 156/621; 423/351; 423/592; 501/92; 505/1; 528/31
[58] Field of Search ............... 423/344, 345, 592, 351; 264/65; 528/28, 31; 505/1; 156/621; 501/92

[56] References Cited

U.S. PATENT DOCUMENTS

| | | | |
|---|---|---|---|
| 4,552,786 | 11/1985 | Berneburg et al. | 427/249 |
| 4,845,056 | 7/1989 | Yamanis | 501/12 |
| 5,011,819 | 4/1991 | Leibovitz | 505/1 |

OTHER PUBLICATIONS

Matson et al., "Supercritical Fluid Technologies for Ceramic Processing Applications", J. Am. Ceram. Soc., 72(6), 871–881 (1989).

*Primary Examiner*—Olik Chaudhuri
*Assistant Examiner*—Ken Horton
*Attorney, Agent, or Firm*—H. Jay Spiegel

[57] ABSTRACT

The present invention relates to high performance ceramics and methods for their production using supercritical temperatures and supercritical pressures. Furthermore, the present invention relates to high performance ceramics for use in the automobile industry.

3 Claims, No Drawings

PRODUCTION OF ULTRASTRUCTURAL CERAMICS BY SUPERCRITICAL PROCESSING OF THE CERAMIC PRECURSOR

This application is a continuation of application Ser. No. 07/551,300 filed Jul. 11, 1990 now abandoned, which is a continuation of Ser. No. 238,735, filed Aug. 31, 1988, now U.S. Pat. No. 4,961,913.

BACKGROUND OF THE INVENTION

High performance ceramics are finding their way more and more into automobile applications. Advanced ceramics have high compressive strength and hardness combined with useful strength. On the other hand, however, ceramics fail catastrophically, are flaw sensitive, and are difficult to prepare reproducibly. All these characteristics must be taken into consideration for any potential application.

Automotive applications often require tribological surfaces with minimal lubrication or high temperature performance. Specific strength and modulus are particularly useful for unsprung mass components. Low heat rejection engines have the potential for increased efficiency. Increased efficiency requires higher operating temperatures, which, in turn, requires materials that can tolerate such temperatures, namely, ceramics.

In a ceramic gas turbine engine, the ceramic parts are the combustor, nose cone, stators, rotors, rotor shrouds, and regenerators. Hot gas from the combustor is directed by the nose cone and stators against the blades of the rotors. The exhaust passes through the regenerators, which recover much of the residual heat, passing it on to the inlet air heading for the combustor. Of these ceramic components, the most demanding is the turbine rotor, which is subject to high mechanical stress, high temperature, thermal shock, and an oxidizing atmosphere.

Silicon nitride ($Si_3N_4$) and silicon carbide (SiC) are useful for many applications. These materials form essentially covalent, three-dimensional structures and are extremely refractory. Because of their refractory nature, they are generally formed into solid bodies from powder by sintering, with or without external pressure. However, because of the high strength of their chemical bonds, atomic diffusion coefficients are extremely low below their respective decomposition temperatures (~1900° C. for $Si_3N_4$ and ~3000° C. for SiC), and the pure materials don't sinter well, even under pressure (hot pressing). To achieve dense $Si_3N_4$ or SiC bodies, additives called sintering aids must be mixed with the powders before firing. Alternatively, a somewhat indirect sintering process called reaction bonding can be used. Hot pressing, incidentally, is unsatisfactory for preparing ceramic bodies of complex shape. Simple shapes can be machined into complex ones, but the cost is prohibitive.

$Si_3N_4$ exists in two hexagonal crystalline forms that have similar atomic arrangements; the $\beta$ form, however, is slightly more symmetric than the $\alpha$. The relationship between the two forms is not entirely clear, because the $\alpha$ readily transforms into the $\beta$ form on heating, but the reverse transformation has not been reported. Because silicon oxide ($SiO_2$) is more stable than $Si_3N_4$, the nitride owes its oxidation resistance to a passive oxide surface layer. A number of reactions can be used to prepare $Si_3N_4$, among them the direct nitriding of silicon $$3Si + 2N_2 \rightleftharpoons Si_3N_4$$

the reaction of silicon tetrachloride with ammonia $$3SiCl_4 + 16NH_3 \rightleftharpoons Si_3N_4 + 12NH_4Cl,$$

and the reaction of silica, carbon, and nitrogen $$3SiO_2 + 6C + 2N_2 \rightleftharpoons Si_3N_4 + 6CO.$$

Other methods for the production of silicon nitride are illustrated in U.S. Pat. Nos. 4,073,845; 4,177,230; 4,264,565; 4,397,828; 4,399,115; 4,405,589.

A method for making $Si_3N_4$ which is finding more industrial use is the use of organometallic halides to make polymeric silicon nitride precursors. However, one problem with silicon nitride made from organometallic precursors is its excessive residual halide content. Organometallic halides are nitrogen deficient and prone to excessive carbon content. Cross-linking and oligomer formation are associated with high carbon content and insoluble polymers. Organometallic halides often have volatile products and reduced yields. Control over product quality has been limited.

The following United States patents illustrate how to make polymeric precursors for silicon nitride: U.S. Pat. Nos. 3,809,713; 4,097,294; 4,395,460; and 4,612,383.

U.S. Pat. No. 4,676,966 illustrates the making of silicon carbide from organosilicon compounds. The article appearing in the *British Polymer Journal*, Vol. 18, pgs. 355-358 (1986) discloses polymeric routes to silicon carbide.

The most commonly-used sintering aids for $Si_3N_4$ are magnesium oxide (MgO) and yttrium oxide ($Y_2O_3$). These additives apparently act by forming relatively low melting silicates with the passive silica layer on each nitride particle, and with any impurity oxides present. At sintering, or at hot pressing temperatures (~1700° C.), this silicate is liquid and promotes liquid-phase sintering. On cooling, it forms a glassy intergranular layer that binds the $Si_3N_4$ grains together. This makes for an extremely strong material at room temperature, with flexural strengths over 100,000 psi. Unfortunately, at temperatures above about 1000° C., the glassy intergranular layer softens, leading to a substantial loss of strength and resistance to creep. In this respect, $Y_2O_3$ appears to be a better sintering aid than MgO, because strength is retained to a higher temperature. However, a different problem has been encountered with some $Y_2O_3$-sintered and hot-pressed silicon nitrides, namely, intermediate temperature oxidation. At around 1000° C., although not at higher or lower temperatures, some of these materials appear to be quite prone to oxidation. Recent evidence suggests that this susceptibility to intermediate temperature oxidation is characteristic of certain intergranular phase compositions and that the problem might be minimized by suitable composition control.

The technique of preparing reaction-bonded $Si_3N_4$ bodies involves forming the desired shape from silicon powder and then nitriding it. By choosing the proper density for the silicon powder body, it is possible, in principle, to obtain a fully dense $Si_3N_4$ body with the same size and shape as the original silicon powder body, the $Si_3N_4$ formed just filling the pores. However, in practice the interiors of bodies with densities greater than about 85% of theoretical cannot be fully nitrided because a dense $Si_3N_4$ outer layer seals off the interior from access to nitrogen. Because the optimum nitriding temperature (~1400° C.) is close to the melting point of silicon, and because the nitriding reaction is exothermic, great care is exercised to avoid the formation of molten blobs of silicon in the interior that, because they are larger than the solid silicon particles, do not nitride completely and are sources of mechanical weakness in the product when they solidify. A relatively elaborate nitriding cycle, taking about a week, is employed. The nitriding rate is increased if a little iron is mixed with the silicon powder compact. The iron appears to break up or modify the passive oxide layer on the Si particles so that nitriding can proceed more easily.

Because reaction-bonded $Si_3N_4$ (RBSN) is not fully dense and is about 15% pores, it is not as strong or oxidation resistant as hot-pressed material. On the other hand, because it lacks sintering aids, it retains its strength well at elevated temperature.

A recently developed variant of RBSN is sintered RBSN. This material is prepared by first making RBSN with sintering aid (e.g. $Y_2O_3$) included, and then firing it to bring about further sintering. Densities near theoretical are achieved, with mechanical properties comparable to those of hot-pressed silicon nitride. The advantages of this technique are the ability to form complex shapes and the reduced shrinkage during firing (because one starts with RBSN), which, in turn, yields greater consistency in final size and shape.

SiC, the other high-performance ceramic seriously considered for highly-stressed gas turbine applications, exists in cubic ($\beta$) and hexagonal ($\alpha$) close-packed versions. The $\beta$ form is unique, but the $\alpha$ form has many variants, called polytypes, which involve long period changes in the layer-stacking sequence. Most SiC powder is still made by the Acheson process, essentially the reaction of $SiO_2$ with carbon, with post-treatment to make it suitable for sintering, although other syntheses are also used.

As is the case with $Si_3N_4$, SiC bodies can be prepared by sintering, hot pressing, and a form of reaction bonding. It is just as difficult to sinter or hot press pure SiC as it is to sinter or hot press pure $Si_3N_4$. Again, sintering aids are used, but in the case of SiC different aids and higher temperatures are required. For hot pressing, the usual additive is aluminum oxide ($Al_2O_3$), which may form a liquid with the passive oxide layer and provide a medium for liquid-phase sintering. As with hot-pressed $Si_3N_4$, there is evidence of a decrease in strength at high temperature suggesting the presence of a glassy grain boundary phase. Sintering of SiC is usually carried out at 2000° C. or above, using carbon and boron as sintering aids. It is believed that the carbon removes the passive silica layer, whereas the boron enters the SiC grains, modifying their surface energy to enhance sintering. Liquid-phase sintering does not appear to be involved, and strength is retained to very high temperature.

Reaction-bonded SiC bodies are made by forming the desired shape from SiC powder, an organic binder, and, in some cases, carbon powder. This body is carbonized to convert the organic binder to carbon and then silicided in liquid silicon to convert the carbon to SiC. The resulting bodies can be quite strong but always contain residual silicon which causes them to weaken at about 1300°C. The increase in strength with temperature up to about 1200° C. is believed to result from the plastic flow of silicon serving to heal cracks.

As mentioned above, polymeric precursors to ceramics have been widely investigated. Polymeric precursors are conducive to part shape flexibility, control of chemistry on a molecular level, and high purity starting materials. Polymers can be used with ceramic powders as binders to improve density, provide green strength, and/or supply sintering aids uniformly. The density of reaction bonded silicon nitride (RBSN), usually about 70%, can be increased by infiltrating polymeric silicon nitride precursors. Fibers such as NICALON (Trademark) or NEXTEL (Trademark) are made from polymeric precursors. Polymer ceramic precursors, also referred to as sol-gels, can be used to make monoliths. Silicon nitride made from low-cost precursors have enjoyed limited success in the past due to residual constituents. The usefulness of more complex precursors to silicon nitride is limited by extremely high cost.

OBJECTS AND SUMMARY OF THE INVENTION

A general object of the present invention is to make ceramic materials and ceramic precursors by utilizing reaction conditions which utilize supercritical temperatures and pressures.

A more specific object of the invention is to produce nitrogen-based ceramics from organometallic precursors under conditions of supercritical temperatures and supercritical pressures.

Another object of the present invention is to provide a process for the production of carbide ceramics from organometallic precursors under conditions of supercritical temperatures and supercritical pressures.

A further more specific object of the present invention is the inclusion of a paramagnetic species in the production of silicon nitride fibers.

An object of the invention is a process for making ceramics such as nitrides, oxynitrides, carbonitrides and carbides from organometallic precursors under conditions of supercritical temperature and pressure.

A further object of the present invention is to provide a method for purifying a green form ceramic by extracting impurities with supercritical fluids.

Another specific object of the present invention is a method for producing ceramic materials such as silicon nitride from organometallic precursors such as alkyl halosilanes and dialkylsilanes under conditions of supercritical temperature and supercritical pressure.

Another object of the present invention is to overcome the disadvantages of organometallic halide precursor polymers by using supercritical fluid extraction technology.

DETAILED DESCRIPTION OF THE INVENTION

Before a full description is described below, it is useful to define what the critical temperature and critical pressures are.

The critical temperature is the maximum temperature at which a gas or vapor can be liquified by application of the critical pressure. The critical pressure is the pressure of a vapor at its critical point as is defined by $$\left(\frac{\partial p}{\partial v}\right)_T = \left(\frac{\partial^2 p}{\partial v^2}\right)_T = 0$$

The critical point is the point where two phases, which are continually approximating each other, become identical and form but one phase. With a liquid in equilibrium with its vapor, the critical point is such a combination of temperature and pressure that the specific volumes of the liquid and its vapor are identical, and there is no distinction between the two states.

The historic disadvantages of organometallic halide precursor polymers can be overcome by Supercritical Fluid Extraction (SFE) technology. The technology of supercritical fluids is fully described in Kirk Othmer, *Encyclopedia of Chemical Technology*, pgs. 872–893, which article is fully incorporated into this application by reference.

SFE has the advantages of distillation, liquid extraction, and pressure-assured densification. Slight changes in temperature and pressure in the critical region cause extremely large changes in solvent density and dissolving power. SFE has wide flexibility for extractive separation by varying pressure, temperature, choice of solvent, and entrainers (additives). Otherwise insoluble polymers dissolve in supercritical fluids at 2 to 7 orders of magnitude in excess of amounts predicted by the ideal gas law. SFE is capable of both high solubility-based extraction due to supercritical fluid density of the solvent near liquid density and nearly-complete solvent-extract separation due to supercritical fluid density of the solvent near gaseous density. In addition to density, the viscosity and diffusivity for supercritical fluids are intermediate between those of a liquid and a gas. (See Table 1). A supercritical fluid has a density near that of a liquid for high solubility, however, diffusivity is orders of magnitude greater for improved mass transfer rates. Supercritical solvents are more capable of penetrating the micropores of a solid.

TABLE 1

| PROPERTY | Physical Properties of a Typical Gas, Supercritical Fluid, and Liquid | | |
|---|---|---|---|
| | GAS | SUPERCRITICAL FLUID | LIQUID |
| density, g/cm$^3$ | $10^{-3}$ | 0.3 | 1 |
| viscosity, mPa·s (= cP) | $10^{-2}$ | 0.1 | 1 |
| diffusion coefficient, cm$^2$/s | 0.1 | $10^{-3}$ | $5 \times 10^{-6}$ |

SFE is carried out at temperatures up to 500° C. and pressures up to 8000 psi in an autoclave. Confinement in an autoclave increases yields of product from otherwise too volatile reactants. High pressure is conducive to polymerization and densification. In the critical region at pressures (P/P$_c$) of $\sim$1.2, the fluid is highly compressible. Cubic equations of state and random mixing rules predict solubility less than actual solubility. Attractive forces lead to large negative values for the partial molar volume of the solute. The mixture becomes highly oriented.

The present process uses supercritical ammonia as both a solvent and a reactant with and without a supercritical hydrogen partial pressure. Liquid ammonia is a powerful solvent recognized by Cheronis in 1947 (see U.S. Pat. No. 2,564,674) for its value as a source of nitrogen for reaction with organic silicon tri-halides and other organometallic halides containing silicon. Supercritical ammonia is vastly more useful because it can simultaneously dissolve an increasingly intractable polymer, supply nitrogen, and extract reaction products. Supercritical hydrogen reacts with some of the methyltrichlorosilane or dimethyldichlorosilane to polymerize the reactants and act as an entrainer to further facilitate extraction. Controlling the amount of hydrogen in the reaction controls the amount of crosslinking and oligomer formation. Hydrogen minimizes residual carbon content in the ceramic product.

Hydrogen content is approximately $10^{-5}$M in the silane reactants. Hydrogen can be added to the autoclave or metals such as Mg can be added to strip hydrogen from the ammonia. Magnesium reacts to form an amide if a small amount of ammonium chloride is present to act as a catalyst:

Other metals such as Al, Be, Y, Ce, Ca, Ti, Zr, Hf, Li, Fe, Cr, Co, and Ni can fulfill much the same role as Mg. These metals have the added benefit of forming an oxynitride second phase with oxygen contaminants.

Reactants are typically 5% by weight in liquid ammonia. Concentration is limited by the solubility of reactants and the products of the reaction. Large amounts of NH$_4$Cl.HCl are produced during polymerization. Efficient removal is critical to the quality of the ceramic product. Ammonium chloride is soluble up to 96.33 mg/cc in liquid ammonia and even higher (through as yet undetermined) concentrations in supercritical ammonia. Supercritical ammonia solution with NH$_4$Cl.HCl can be withdrawn from a pressure vessel and decompressed to precipitate NH$_4$Cl.HCl. Ammonia can then be compressed and recycled.

Crack-free monoliths require careful attention to pressurization and heating rates. The system should be "soaked" at points of extraction to assure complete extraction. Heat and pressure distribution within the pressure vessel must be evenly distributed at all times. The autoclave is purged with argon gas before loading with reactants. Hydrogen gas is slowly added to the autoclave. Ammonia pressure should not be increased faster than 1000 psi per hour but preferably 200 psi to 300 psi per hour. Pressure is increased to the supercritical region of the solvent NH$_3$, approximately 1,653.8 psi to 2,149.9 psi. More or less pressure may be required depending on the use of second phase additives, solute-solute reactions, or organometallic reactants. Temperature is slowly increased at a rate not exceeding 50° C. per hour, but preferably about 30° C. per hour up to as high a temperature as 500° C., though typically only 300° C. to 400° C. After extracting organic and halide compounds from the polymerized reactants, the autoclave is slowly decompressed (not exceeding 500 psi/hr) and cooled (not faster than 100° C. per hour) and the remaining "green form" ceramic removed.

Green form silicon nitride is slowly pyrolyzed at 1000° C. for 30 minutes at rates as slow as 30° C. per hour through the 300°–700° C. region. Over 1000° C., the furnace is pressurized to 375 psi to 750 psi to prevent oxynitride bubbling as the temperature is increased to further assure transformation to the beta phase when cooling. Depending on second phase content, final sintering is at temperatures of 1370° C. to 1750° C.

The use of a paramagnetic phase containing metals such as Fe or other paramagnetic metals in the periodic table of the elements can be added. The use of a paramagnetic phase allows for orientation during supercritical fluid extraction, pyrolysis and/or sintering.

The silane reagents of the present invention are selected from the group of alkyltrichlorosilanes, trialkylchlorosilanes, dialkyldichlorosilanes, and dialkylsilanes wherein the alkyl group can be primary, secondary, tertiary branched and may contain one to ten carbon atoms. The silanes generally belong to the following formulas:

$$R'nSiCl_{4-n}$$

and $$R'nSiH_2$$

Wherein R' is an aliphatic group as defined above and can also be an unsaturated group and n is 1,2 or 3 in the case of the halosilanes and n is 2 in the case of the silane.

Typical examples of the above compounds are: dimethyldichlorosilane, diethyldichlorosilane, dimethylsilane, diethylsilane, dipropyldichlorosilane, dipropyl silane, trichloromethyl silane, trichloroethyl silane, trichloropropyl silane, dichlorodibutyl silane, chlorotriethyl silane, and chlorotripropyl silane; chloroalkenyl silane such as trichlorovinyl silane, dichlorodivinyl silane, trichloroallyl silane, and chlorotriallyl silane; chloroaryl silane such as trichlorophenyl silane, dichlorophenyl silane, chlorotriphenyl silane, trichlorotolyl silane, and dichloroditolyl silane; and chloroalkaryl silane such as trichlorobenzyl silane and dichlorodibenzyl silane.

The nitrogen-containing reactant of the present invention is typically ammonia but other nitrogen-containing materials such as hydrazine, primary, and secondary amines can be used.

For making carbide ceramics, a hydrocarbon such as methane, ethane, propane, butane and hydrocarbons containing up to 20 carbon atoms can be used. The temperature range for making the carbide ceramics is between about room temperature and 285° C. The pressures are typically between 185 psi to as high as 8000 psi.

The process of the present invention further incorporates additives selected from the groups of metal halides including $YCl_3$, $AlCl_3$, $MgCl_2$, and $BeCl_2$. Halides of the following metals are also useful: Ce, Ca, Fe, Ti, Zr, Hf, Co, and Ni. Mixtures of the above halides may be added to the reaction mixture. The metal halides are added so as to form an oxynitride phase. The halides are also useful as sintering aids.

Metal hydrides of metals such as Y, Mg, Be, Ca, Ti, Zr, and Hf, and oxides and hydroxides of Y, Mg, Be, Ce, Ca, Fe, Ti, Zr, Hf, Co and Ni can also be added to form the oxynitride second phase. Oxygen containing organometallic additives can also be incorporated to form the oxynitride second phase.

In the process for making the carbide polymeric precursors and ceramics, metal halides selected from the groups of $BCl_3$, $AlCl_3$, $TiCl_4$, $NiCl_2$, $FeCl_3$, $BeCl_2$ and $MgCl_2$ may be added as sintering aids. Metal hydrides made from metals such as B, Ti, Be and Mg are also useful.

Certain catalysts are also used to activate Si-H, Si-N, Si-Si and Si-C bonds in the process for making the carbide precursors and ceramics. The catalyst can be homogenous, heterogeneous or a metal complex or cluster. Examples of the above catalysts include $H_4Ru_4(CO)_{12}$, $Ru_3(CO)_{12}$, $Fe_3(CO)_{12}$, $Rh_6(CO)_{12}$, $Co_2(CO)_8$, $(Ph_3P)_2Rh(CO)H$ (where Ph is phenyl), $H_2PtCl_6$, nickel cyclooctadiene complex, $Os_3(CO)_{12}$, $Ir_4(CO)_{12}$, $(Ph_3P)_2Ir(CO)H$, (where Ph is phenyl), $Pd(OAc)_2$, $Cp_2$, $TiCl_2$, $(Ph_3P)_3RhCl$, $H_2Os_3(CO)_{10}$, $Pd(Ph_3P)_4$, $Fe_3(CO)_{12}/Ru_3(CO)_{12}$ and mixtures thereof.

Other catalyst compositions include: Pt/C, Pt/BaSO$_4$, Cr, Pd/C, Co/C, Pt black, Co black, Pd black, Ir/Al$_2$O$_3$, Pt/SiO$_2$, Ph/TiO$_2$, Rh/La$_2$O$_3$, Pd/Ag alloy, LaNi$_5$, PtO$_2$.

Polymeric precursors which can be used to make silicon carbide are those described in the *British Polymer Journal*, Vol. 18, pages 355–358 (1986), whose contents are incorporated into this specification by reference.

The polymeric precursors for making silicon nitride and their methods of preparation are exemplified in U.S. Pat. Nos. 2,564,674, 3,809,713, 4,097,294, 4,395,460 and 4,612,383, whose contents are incorporated into this specification by reference.

All of the above polymers can be made using supercritical temperatures and pressures and can also be purified by supercritical fluid extraction.

Organometallic halide compounds and/or organometallic hydride compounds can be reacted under inert, nitrogen, or ammonia atmosphere to polymerize and/or cure to "green form" ceramics. Pyrolysis over 750° C. yields a ceramic. Silicon nitride obtained from polysilizanes typically costs $100 to $550 per pound. The present process uses Supercritical Fluid Extraction (SFE) to eliminate the need for complex and expensive organometallic precursors. Organometallic precursors for the present process retail for $9.25 to $10.50 per pound.

EXAMPLES

The foregoing examples illustrate in more detail the present invention.

EXAMPLE 1

A silicon nitride object is made by mixing 179.5 cc dimethyldichlorosilane ($C_2H_6Cl_2Si$) with 27.19 gm $Fe_2O_3$, 13.91 gm anhydrous $YCl_3$, and 3.92 gm anhydrous $AlCl_3$ in a pressure vessel at 506 psi to 658 psi to form a supercritical fluid under inert atmosphere. The supercritical fluid is infiltrated into a silicon nitride powder compress weighing 221.9 gm. Anhydrous ammonia is added to the pressure vessel at a 200 psi/hr rate until the pressure reaches the supercritical region for ammonia, 1,654 psi to 2150 psi. The vessel is heated at a 20° C./hr to 30° C./hr rate to 400° C. and "soaked" for 1 hour to completely react the silane to silicon nitride and extract the by-products. The supercritical ammonia solution containing by-products is bled away from the silicon nitride at 200 psi/hr rate into a tank. By-products precipitate from the ammonia as the ammonia decompresses. Ammonium chloride HCl and amine by-products can be distilled and resold. Ammonia gas can be liquified for re-use or used for fertilizer. The "green form" silicon nitride is slowly heated under 500 psi nitrogen to 800° C. at a rate of 20° C. to 30° C./hr to completely cure the material. Silicon nitride is then heated to 1650° C.

EXAMPLE 2

Example 1 wherein $H_2$ is added to $10^{-5}M$ in the reactants.

EXAMPLE 3

Example 1 wherein reaction bonded silicon nitride is used instead of pressed silicon nitride powder.

EXAMPLE 4

AlON can be made from reacting 5% AlOCl in anhydrous ammonia with $10^{-5}$M hydrogen. 100 gm AlOCl is mixed with 8.21 gm $YCl_3$, 7.17 gm $SiCl_4$, and 50 ppm $FeCl_3$ and placed in a pressure vessel. Anhydrous ammonia is added to the vessel at 500 psi/hr until 8000 psi is reached. The mixture is heated at 20° C./hr to 30° C./hr rate to 400° C. and soaked for one hour until halides are extracted as $NH_4Cl$. Ammonia with $NH_4Cl$ in solution is diverted at 200 psi/hr rate into a closed vessel to precipitate ammonium chloride and recover the ammonia. The green form AlON is heated at 20° C./hr to 30° C./hr rate to 1400° C. under 500 psi $N_2$ to fully cure the ceramic.

EXAMPLE 5

Silicon nitride fibers can be made by mixing 100 cc $C_2H_6Cl_2Si$, 3.295 gm $Fe_2O_3$, 1.69 gm $YCl_3$, and 0.475 gm $AlCl_3$ with anhydrous ammonia in a pressure vessel. Materials are polymerized as the temperature is raised at 20° C./hr to 30° C./hr to 400° C. and the ammonia pressure is increased to the supercritical region 1684 psi to 2150 psi at 200 psi/hr rate. The pressure vessel is tapped to educt viscous polymer through spinnerets into a slightly reduced pressure vessel. The fiber is drawn under light tension through an electromagnet and furnace to align iron compound crystals as well as silicon nitride crystals in the fiber as it is cured to a ceramic filament at 800° C.

EXAMPLE 6

Silicon carbide is made from dimethyldichlorosilane ($C_2H_6Cl_2Si$) in a supercritical methane atmosphere. Dimethyldichlorosilane is placed in a pressure vessel with $10_{-5}$M hydrogen with 0.5 wt % B in the form of $BH_3.NH_2C(CH_3)_3$. The mixture is pressurized with methane at 50 psi/hr rate to 506 psi to 658 psi and "soaked" for 1 hour or more depending on the size of the sample. Pressure is raised to 970 psi to 1260 psi at 50 psi/hr rate. The temperature of the system is increased to 350° C. at 20° C./hr rate and held at temperature for 1 hour. Because Supercritical Fluid Extraction results in near theoretical yields, stoichiometric carbon can be controlled by the mole ratio of reactants in the autoclave. Green form silicon carbide is heated under 500 psi argon to 1000° C. at a 20° C./hr to 30° C./hr rate. Beyond 1000° C. the temperature can be rapidly raised to 2050° C.

EXAMPLE 7

A silicon nitride object is made by mixing 220.6 cc diethyldichlorosilane ($C_4H_{10}Cl_2Si$) with 27.19 gm $Fe_2O_3$, 13.91 gm anhydrous $YCl_3$, and 3.92 gm anhydrous $AlCl_3$ in a pressure vessel at 506 psi to 658 psi to form a supercritical fluid under inert atmosphere. The supercritical fluid is infiltrated into a silicon nitride powder compress weighing 221.9 gm. Anhydrous ammonia is added to the pressure vessel at a 200 psi/hr rate until the pressure reaches the supercritical region for ammonia, 1654 psi to 2150 psi. The vessel is heated at a 20° C./hr to 30° C./hr rate to 400° C. and "soaked" for one hour to completely react the silane to silicon nitride and extract the byproducts. The supercritical ammonia solution containing byproducts is bled away from the silicon nitride at 200 psi/hr rate into a tank. By-products precipitate from the ammonia as the ammonia decompresses. Ammonium chloride HCl and amine by-products can be distilled and resold. Ammonia gas can be liquified for re-use or used for fertilizer. The "green form" silicon nitride is slowly heated under 500 psi nitrogen to 800° C. at a rate of 20° C./hr to 30° C./hr to completely cure the material. Silicon nitride is then heated to 1650° C.

EXAMPLE 8

Example 7 wherein $H_2$ is added to $10^{-5}$M in the reactants.

EXAMPLE 9

Example 7 wherein reaction bonded silicon nitride is used instead of pressed silicon nitride powder.

EXAMPLE 10

AlON can be made from reacting 5% AlOCl in anhydrous ammonia with $10^{-5}$ hydrogen. 100 gm AlOCl is mixed with 8.21 gm $YCl_3$, 7.17 gm $SiCl_4$, and 50 ppm $FeCl_3$ and placed in a pressure vessel. Anhydrous ammonia is added to the vessel at 400 psi/hr until 8000 psi is reached. The mixture is heated at 20° C./hr to 30° C./hr rate to 400° C. and soaked for one hour until halides are extracted as $NH_4Cl$. Ammonia with $NH_4Cl$ in solution is diverted at 200 psi/hr rate into a closed vessel to precipitate ammonium chloride and recover the ammonia. The green form AlON is heated at 20° C./hr to 30° C./hr rate to 1400° C. under 500 psi $N_2$ to fully cure the ceramic.

EXAMPLE 11

Silicon nitride fibers can be made by mixing 122.9 cc diethyldichlorosilane, 3.295 gm $Fe_2O_3$, 1.69 gm $YCl_3$, and 0.475 gm $AlCl_3$ with anhydrous ammonia in a pressure vessel. Materials are polymerized as the temperature is raised at 20° C./hr to 30° C./hr rate to 400° C. and the ammonia pressure is increased to the supercritical region of 1684 psi to 2150 psi at 200 psi/hr rate. The pressure vessel is tapped to educt viscous polymer through spinnerets into a slightly reduced pressure vessel. The fiber is drawn under light tension through an electromagnet and furnace to align iron compound crystals as well as silicon nitride crystals in the fiber as it is cured to a ceramic filament at 800° C.

EXAMPLE 12

Silicon carbide is made from diethyldichlorosilane ($C_2H_6Cl_2Si$) in a supercritical methane atmosphere. Diethyldichlorosilane is placed in a pressure vessel with $10^{-5}$M hydrogen with 0.5 wt % B in the form of $BH_3.NH_2C(CH_3)_3$. The mixture is pressurized with methane at 50 psi/hr rate to 506 psi to 658 psi and "soaked" for 1 hour or more depending on the size of the sample. Pressure is raised to 970 psi to 1260 psi at 50 psi/hr rate. The temperature of the system is increased to 350° C. at 20° C./hr to 30° C./hr rate and held at temperature for 1 hour. Because Supercritical Fluid Extraction results in near theoretical yields, stoichiometric carbon can be controlled to some degree by the mole ration of reactants. Green form silicon carbide is heated under 500 psi argon to 1000° C. at a 20° C./hr to 30° C./hr. Beyond 1000° C. the temperature can be rapidly raised to 2050° C.

From the foregoing, it will be appreciated that, although specific embodiments of the invention have been described herein for purposes of illustrations, various modifications may be made without departing from the spirit and scope of the invention.

I claim:

1. A process for the purification of ceramic polymeric precursors comprising reacting a ceramic polymeric precursor with a fluid by soaking said ceramic polymeric precursor in said fluid under conditions subjecting said ceramic polymeric precursor and fluid to supercritical pressure and supercritical temperature thereby creating a monolithic structure, and extracting by-products from said ceramic polymeric precursor.

2. The method of claim 1, wherein said by-products include halogen containing compounds, organic compounds and amine containing compounds.

3. The method of claim 1, wherein said fluid comprises an ammonium based compound.

* * * * *